(12) United States Patent
Bovyrin et al.

(10) Patent No.: US 7,751,589 B2
(45) Date of Patent: Jul. 6, 2010

(54) THREE-DIMENSIONAL ROAD MAP ESTIMATION FROM VIDEO SEQUENCES BY TRACKING PEDESTRIANS

(75) Inventors: Alexander Bovyrin, Novgorod (RU); Konstantin Rodyushkin, Novgorod (RU)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 10/581,333

(22) PCT Filed: Apr. 18, 2005

(86) PCT No.: PCT/RU2005/000209

§ 371 (c)(1),
(2), (4) Date: May 31, 2006

(87) PCT Pub. No.: WO2006/115427

PCT Pub. Date: Nov. 2, 2006

(65) Prior Publication Data

US 2009/0028384 A1    Jan. 29, 2009

(51) Int. Cl.
*G06K 9/00* (2006.01)
*G06F 17/00* (2006.01)

(52) U.S. Cl. .............. 382/103; 382/100; 382/232; 382/268; 382/154; 382/145; 701/1; 701/213; 701/200; 701/207

(58) Field of Classification Search .......... 382/113, 382/192, 241, 242, 100, 103, 145, 154, 232, 382/268; 340/995.14, 995.22, 995.23, 995.24; 348/143, 155; 701/1, 200, 207, 213, 214
See application file for complete search history.

(56) References Cited

U.S. PATENT DOCUMENTS

| 6,901,264 | B2 * | 5/2005 | Myr .................... 455/456.5 |
| 7,542,882 | B2 * | 6/2009 | Agrawala et al. ............ 703/2 |
| 2001/0043738 | A1 * | 11/2001 | Sawhney et al. ............ 382/154 |
| 2006/0023786 | A1 * | 2/2006 | Li et al. ................. 375/240.16 |
| 2006/0062296 | A1 * | 3/2006 | Li et al. ................. 375/240.12 |
| 2006/0082472 | A1 * | 4/2006 | Adachi et al. .......... 340/995.13 |
| 2007/0014488 | A1 * | 1/2007 | Chen et al. ................ 382/294 |

OTHER PUBLICATIONS

Foreground Object Detection from Videos Containing Complex Background; Li et al ; Nov. 2003.*
Viewpoint Independent Detection of Vehicle Trajectories and Lane Geometry . . . Jos0 Melo, Andrew Naftel, Alexandre Bernardino, Jos6 Santos-Victor ICIAR—Porto, Portugal, Sep. 29-Oct. 1, 2004.*

(Continued)

*Primary Examiner*—Wesley Tucker
*Assistant Examiner*—Nancy Bitar
(74) *Attorney, Agent, or Firm*—D'Ann Naylor Rifai

(57) ABSTRACT

Estimation of a 3D layout of roads and paths traveled by pedestrians is achieved by observing the pedestrians and estimating road parameters from the pedestrian's size and position in a sequence of video frames. The system includes a foreground object detection unit to analyze video frames of a 3D scene and detect objects and object positions in video frames, an object scale prediction unit to estimate 3D transformation parameters for the objects and to predict heights of the objects based at least in part on the parameters, and a road map detection unit to estimate road boundaries of the 3D scene using the object positions to generate the road map.

11 Claims, 7 Drawing Sheets

OTHER PUBLICATIONS

Learning Surveillance Tracking Models for the Self-Calibrated Ground Plane J. Renno, J. Orwell and G.A. Jones British Machine Vision Conference 2002.*

Missing IDS page dated Jan. 19, 2010.*

Melo, et L: Viewpoint Independent Detection of Vehicle Trajectories and Lane Geometry from Uncalibrated Traffic Sruveillance Cameras; ICIAR—Int'l Conf on Image Analysis & Recognition, Porto, Portugal, Oct. 1, 2004, XP002370074.

Renno, et al: Learning Surveillance Tracking Models for the Self-Calibrated Ground Plane; British Machine Vision Conference 2002, XP002370075.

Melo, et al: Retrieval of Vehicle Trajectories and Estimation of Lane Geometry Using Non-Stationary Traffic Surveillance Cameras; ACIVS Advanced Concepts for Intelligent Vision System, Sep. 3, 2004, XP002370076.

Internation Application: PCT/RU2005/000209 Int'l Search Report & Written Opinion Dated: Mar. 15, 2006.

International Preliminary Report on Patentability for Patent Application No. PCT/RU2005/000209, mailed Nov. 1, 2007, 8 pages.

* cited by examiner

THREE-DIMENSIONAL ROAD MAP ESTIMATION FROM VIDEO SEQUENCES BY TRACKING PEDESTRIANS

CROSS-REFERENCE TO RELATED APPLICATION

This application is a National Phase application of, and claims priority to, International Application No. PCT/RU2005/000209, filed Apr. 18, 2005, entitled "THREE-DIMENSIONAL ROAD MAP ESTIMATION FROM VIDEO SEQUENCES BY TRACKING PEDESTRIANS"

BACKGROUND

1. Field

The present invention relates generally to video surveillance and, more specifically, to analysis of movement of objects in a three dimensional (3D) scene.

2. Description

Video surveillance systems are used to provide security for people and locations. In early systems, video images were continuously monitored by security personnel. When observing multiple displays for long periods of time, personnel often experienced fatigue and often missed events of interest occurring in captured images of a scene being monitored. In response, some video surveillance systems captured images only when something changed in the scene being monitored. However, these systems still required manual control and observation by security personnel.

More recently, various techniques for automatically capturing and analyzing images have been developed. Computer vision has become a recognized branch of computer science research. However, much work remains in developing practical applications that automatically capture and analyze images in a surveillance system.

BRIEF DESCRIPTION OF THE DRAWINGS

The features and advantages of the present invention will become apparent from the following detailed description of the present invention in which.

DETAILED DESCRIPTION

Figure 1:
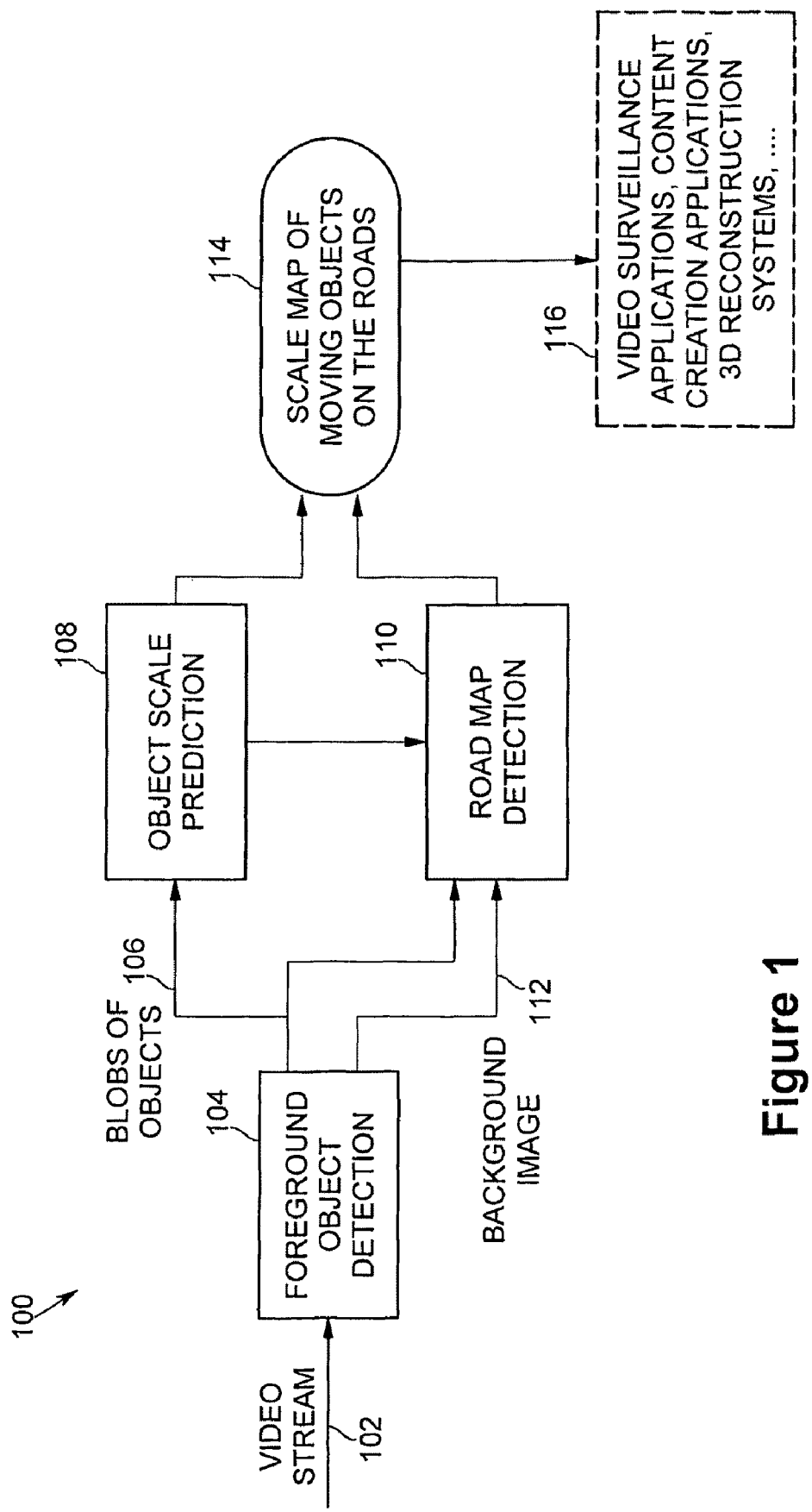
FIG. 1 is a block diagram of a processing system according to an embodiment of the present invention.

An embodiment of the present invention comprises a method and system for automatically learning the three-dimensional (3D) structure of an outdoor scene observed by a single uncalibrated video camera. In particular, an estimate of the 3D layout of roads and paths traveled by pedestrians may be created by observing the pedestrians over time and by estimating the road parameters from the height and position of the pedestrians in a sequence of video frames. Experiments with real-life outdoor videos show robustness of embodiments of the present invention to camera noise, scene luminance variation, possible mistakes in detection of moving objects, road coverage variation, and camera trembling. The estimated 3D road map (up to a scale factor) can be used in computer vision applications that require calibration of the relative positions between a camera and a 3D scene, such as video surveillance, human activity recognition, and human gait analysis.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

The present invention deals with two interrelated problems: prediction of object scale on an observed scene and road map estimation. The first problem is how to estimate correspondence between two-dimensional (2D) object positions in a scene and object scale. Towards this goal, parameters of a function reflecting the relative position of the camera plane onto the ground plane are estimated using motion trajectories of objects. Embodiments of the present invention include an accurate and robust process to predict the height of objects in a scene.

The object height can be accurately predicted only if the trajectory of the moving object is on a road plane (i.e., ground plane). Embodiments of the present invention include a process for road detection in a scene using information relating to moving objects in a scene that do not conflict with a predicted scale. The approximate position of an object in a video frame can be estimated using one of several known foreground detection techniques (e.g., Liyuan Li, Weimin Huang, Irene Y. H. Gu, and Qi Tian "Foreground Object Detection from Videos Containing Complex Background", Proceedings of the eleventh Association of Computing Machinery (ACM) International Conference on Multimedia, MM2003, 2003). The road map detection process of embodiments of the present invention is robust to errors in estimating the position, scene luminance variation (e.g., during the day), image noise, and road coverage variation (e.g., after rain or snow falling on the scene).

The road map detection process is unsupervised and is able to self-adapt in case of camera motion, partial scene variation and other observed environmental changes. In a video surveillance application program including the present invention as a part, the road map detection process is unsupervised such that no human operator or user is needed to control the process. The road map detection process is able to self-adapt by automatically updating 3D transform parameters if the position of the camera changes or other environmental changes occur (such as a change in lighting conditions, for example). To produce correct results, the process only requires a top-down view of a distant scene. The process is based on the assumption that moving objects are drawn from a known statistical distribution of sizes of objects (e.g., humans), and that all roads on a scene are lying in the same plane. These assumptions are satisfied in most video surveillance tasks, such as human activity recognition, human gait analysis, estimation of object geographic location, and vehicle tracking and counting, for example. The ground plane constraint is frequently incorporated in existing surveillance techniques.

Embodiments of the present invention combine object scale prediction and road map detection to produce accurate and reliable results for 3D layout of roads in a scene captured by a single camera.

FIG. 1 is a block diagram of processing system 100 according to an embodiment of the present invention. A video stream 102 comprises a sequence of video frames captured by a single camera (not shown). Each frame in the sequence comprises a bitmap of pixels, the bitmap having a selected size as captured by the camera. Each frame of the video stream may be processed by a known foreground object detection unit 104 to extract objects (represented by "blobs") in the foreground of each video frame from the background of the frame. Each detected blob has an associated foot print position in the 3D scene at the ground plane. In one embodiment, the foreground object detection unit implements the technique described by Liyuan Li, Weimin Huang, Irene Y. H. Gu, and Qi Tian, in "Foreground Object Detection from Videos Containing Complex Background", Proceedings of the eleventh Association of Computing Machinery (ACM) International Conference on Multimedia, MM2003, 2003. However, in other embodiments, other foreground object detection processes may be used. Foreground object detection unit 104 forwards detected blobs of objects 106 to object scale prediction unit 108 and to road map estimation unit 110. Foreground object detection unit 104 also forwards background image 112 obtained as a result of determining the foreground objects to road map estimation unit 110. Object scale detection unit 108 analyzes the object blobs in the captured scene to estimate their height. Road map estimation unit 110 generates an estimate of the road map of the captured scene. Foreground object detection, object scale prediction, and road map detection may be performed on each video frame of the video stream. The results of the object scale prediction unit and the road map detection unit are combined to produce a scale map of moving objects on the roads 114 of the scene present in the video stream. The scale map may be input to other applications 116, such as video surveillance applications, content creation applications, 3D reconstruction systems, and so on.

Figure 2:
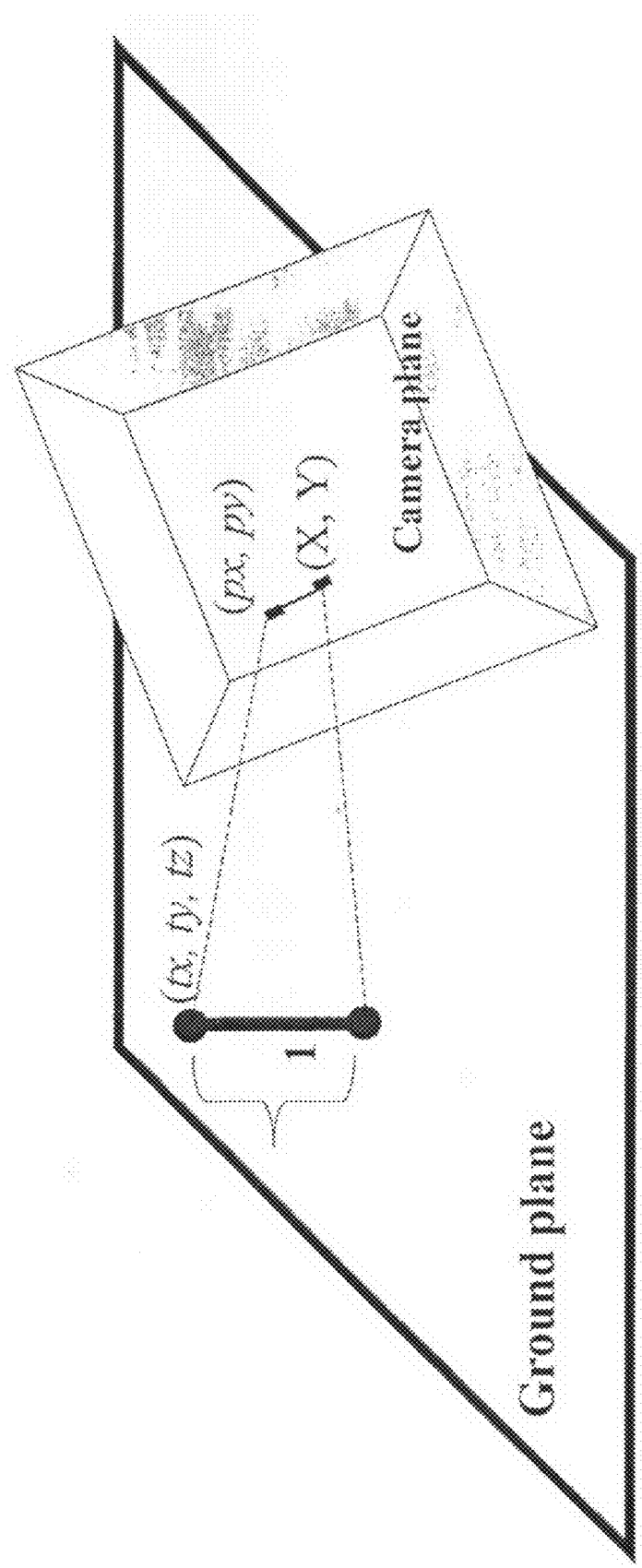
FIG. 2 is a diagram illustrating a projection of an object to a camera plane from a ground plane according to an embodiment of the present invention.

Object scale prediction 108 may be performed on blobs of objects. For each blob detected by the foreground object detection unit in a given video frame, the object scale prediction unit calculates an estimated height of the object based in part on the corresponding blob's foot print. FIG. 2 is a diagram illustrating a projection of an object to a camera plane from a ground plane according to an embodiment of the present invention. In this example, an object (such as a human, for example) in the 3D scene has a "head" at the point (tx, ty, tz) relative to the ground plane of the scene. When the scene is captured by a camera having a camera plane, the object has a foot print at (X, Y) in the camera plane, and a head at (px, py).

Assume a general perspective transform between the camera (not shown) and the captured 3D scene according to the following form:

$$px = fx \frac{R_{xx}tx + R_{xy}ty + R_{xz}tz + R_{x0}}{R_{zx}tx + R_{zy}ty + R_{zz}tz + R_{z0}},$$

$$py = fy \frac{R_{yx}tx + R_{yy}ty + R_{yz}tz + R_{y0}}{R_{zx}tx + R_{zy}ty + R_{zz}tz + R_{z0}},$$

where tx, ty, tz denote 3D world coordinates of an object's head in the scene, $R_{xx}$, $R_{xy}$, $R_{xx}$, $R_{xz}$, $R_{x0}$, $R_{zx}$, $R_{zy}$, $R_{zx}$, $R_{z0}$, $R_{yx}$, $R_{yy}$, $R_{yz}$, $R_{y0}$, $R_{zx}$, $R_{zy}$, $R_{zz}$, and $R_{z0}$ denote constants, and px, py denote coordinates of a point (i.e., the head of the object) in a camera plane.

Let us assume that all moving objects in the scene have almost identical height. Using this assumption one can show that the Y coordinate of the object "head" py in the camera plane depends on its "foot" position (X, Y) in the camera plane according to Equation 1:

$$py = \frac{p_1 X + p_2 Y + p_3}{p_4 X + p_5 Y + 1}. \tag{1}$$

Let us assume without loss of generality that moving objects in a scene are humans. Each human i in the scene has an associated foot print position (X[i], Y[i]) and head y-position (py[i]) in the camera plane. Using an estimated set of N human "foot" positions (X[i], Y[i]), N a positive integer, one can estimate the 3D transformation parameters p1, p2, p3, p4, p5 by minimizing the following functional:

$$\sum_{i=1}^{N} \left( py[i] - \frac{p_1 X[i] + p_2 Y[i] + p_3}{p_4 X[i] + p_5 Y[i] + 1} \right)^2 \rightarrow \min. \tag{2}$$

To solve this minimization problem, in one embodiment a well known numerical iterative optimization (as shown in William H. Press, et al. "Numerical Recipes in C: The Art of Scientific Computing." Cambridge University Press, 1992) may be used to find an initial solution. In other embodiments, other techniques may be used. To find an initial solution of (2), the linear system (3) may be solved using a SVD algorithm (as shown in William H. Press, et al. "Numerical Recipes in C: The Art of Scientific Computing." Cambridge University Press, 1992).

$$py[i](p_4 X[i] + p_5 Y[i] + 1) - (p_1 X[i] + p_2 Y[i] + p_3) = 0 \; i = 1 \ldots N \tag{3}$$

However, there often may be noise in the data set of human foot prints. To reduce the influence of errors in human position estimation and size estimation, an outlier removal procedure may be used to exclude noise blobs in the data set. Height (and scale) for each human blob is predicted using formula (1) with optimal parameters obtained by formula (2). Then, in one embodiment, approximately P % of blobs that have the largest deviation of their predicted height from the actual blob height may be removed from the set of human "foot" points (X[i], Y[i]). In one embodiment, P may be set to approximately 30%. In other embodiments, other values may be used. The largest deviation may occur with blobs that are too small and/or blobs that are too large to be humans. The data set of human foot prints without outliers may be used to retrain the model (1) using equation (2).

Figure 3:
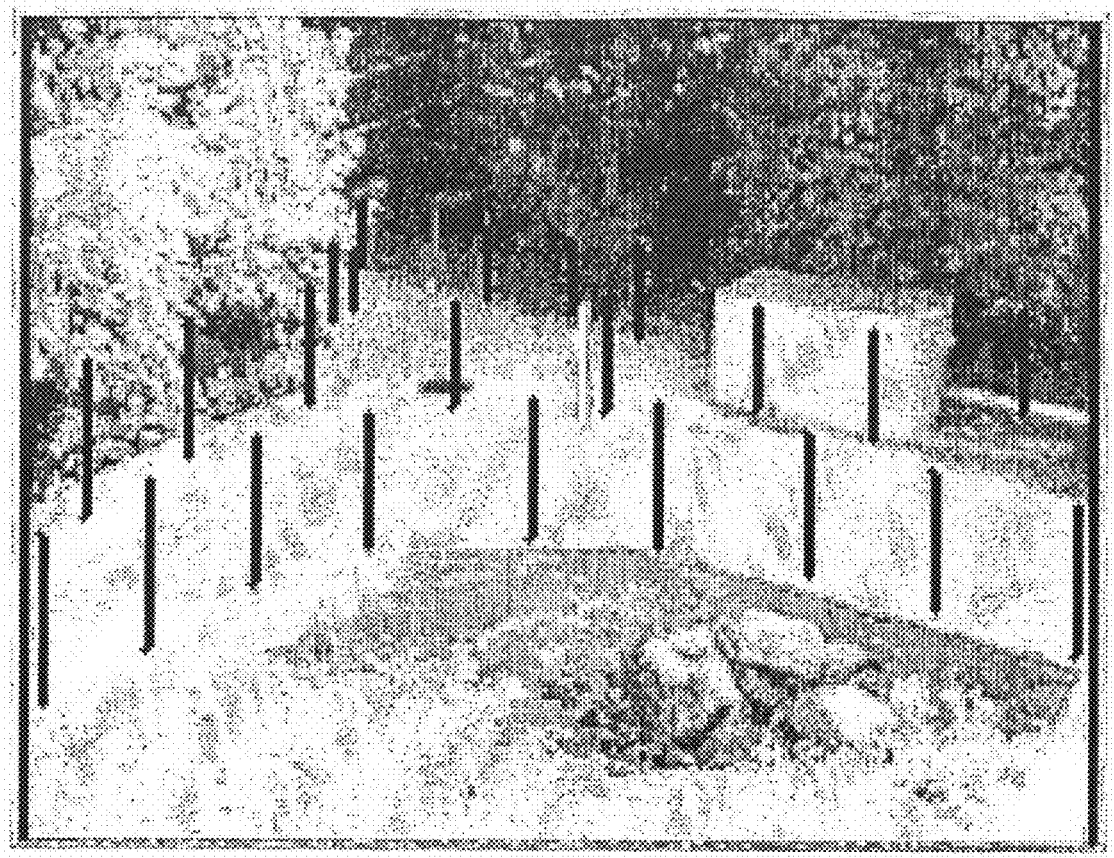
FIG. 3 is a sample image of a scene including height estimation of objects.

The output of the object scale prediction unit 108 after outlier removal are the estimated heights (py[i]−Y[i]) and positions (X[i], Y[i]) for each remaining blob in the video frame. This information can be represented visually on the video frame. FIG. 3 is an example illustrating height estimation of "typical" humans. The black lines correspond to the estimated human height at the corresponding location in the video frame. The white line represents the real (tracked) height of a human blob in the video frame.

Figure 4:
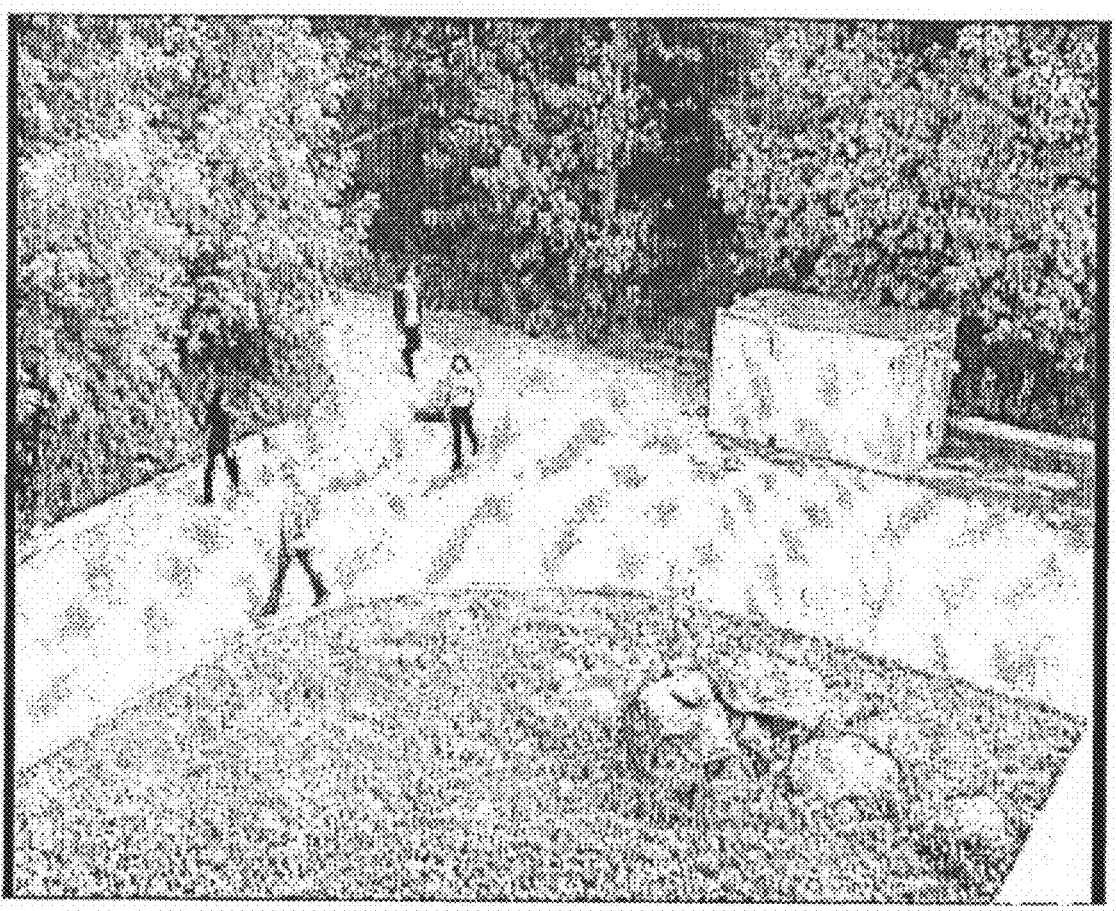
FIG. 4 is a sample image of another scene.

Road map detection may be performed by road map detection unit 110 using the blobs of objects 106 and the background image 112. FIG. 4 is a sample image of a 3D scene. A filtered set of (X[i], Y[i]) positions of object (i.e., human) "feet" may be used for road boundary estimation on the scene. It is assumed that these positions have pixels of the same color as the road, which is assumed to be uniform. Hence, the assumption is that the objects are pedestrians walking on the road. A region growing process may be used to find pixels of the video frame that belong to the road surface. The process fills a connected component starting from the i'th seed pixel (here it is a pixel on a object "foot" at (X[i], Y[i])) where all pixels within the component have a color substantially similar to the seed pixel's color. More formally, the point (x,y) is considered to belong to the "road" if its color in the estimated background image 112 meets the following conditions:

$$(I(X[i], Y[i])_r - t <= I(x,y)_r <= I(X[i], Y[i])_r + t) \text{ AND}$$

$$(I(X[i], Y[i])_g - t <= I(x,y)_g <= I(X[i], Y[i])_g + t) \text{ AND}$$

$$(I(X[i], Y[i])_b - t <= I(x,y)_b <= I(X[i], Y[i])_b + t).$$

Where I refers to intensity, $I_r$, $I_g$, $I_b$ are color components of a pixel in the estimated background image 112, and t is the parameter of road color variation (e.g., t=20). The estimated background image is used to exclude objects from the scene where the roads are estimated. Since road borders usually correspond to edges in the image, the region growing stops when it reaches image edge pixels. This processing may be performed on each video frame. In one embodiment, a known edge detector process by J. Canny described in "A Computational Approach to Edge Detection" IEEE Trans. Patt. Analy. And Mach. Intell., 8(6):679-698, 1986, (also described in "Introductory Techniques for 3-D Computer Vision" by Emanuele Trucco and Alessandro Verri, Prentice Hall, 1998, pp. 71-79) may be used to find these edges. In other embodiments, other edge detection processes may be used.

To reduce the influence of errors in the object "foot" position estimation, in one embodiment the number of times, N, at which the pixel was classified as "road" may be counted and the pixel is considered as belonging to the class of road pixels in a current scene only if N>MaxN*0.1, where MaxN is a maximum value of N from all pixels of the video frame for a scene. Thus, some noise pixels may be excluded from the road map. Such an outlier removal procedure for road map estimation also enables the user to observe only the most "popular" road. Note that the process can correctly analyze scene roads with non-uniform coverage (e.g., causeways).

Figure 5:
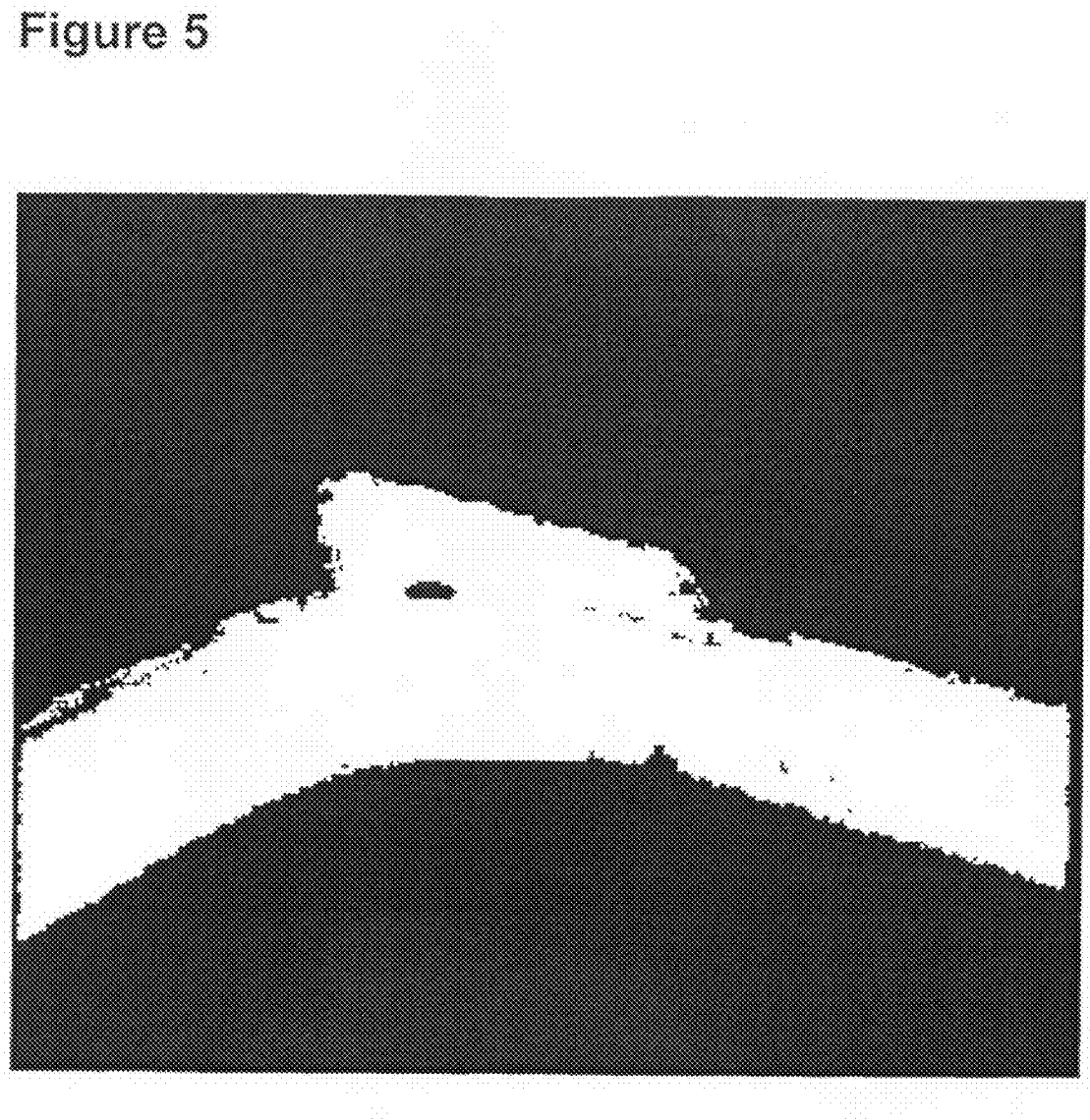
FIG. 5 is a sample road map corresponding to the scene of FIG. 4.
Figure 6:
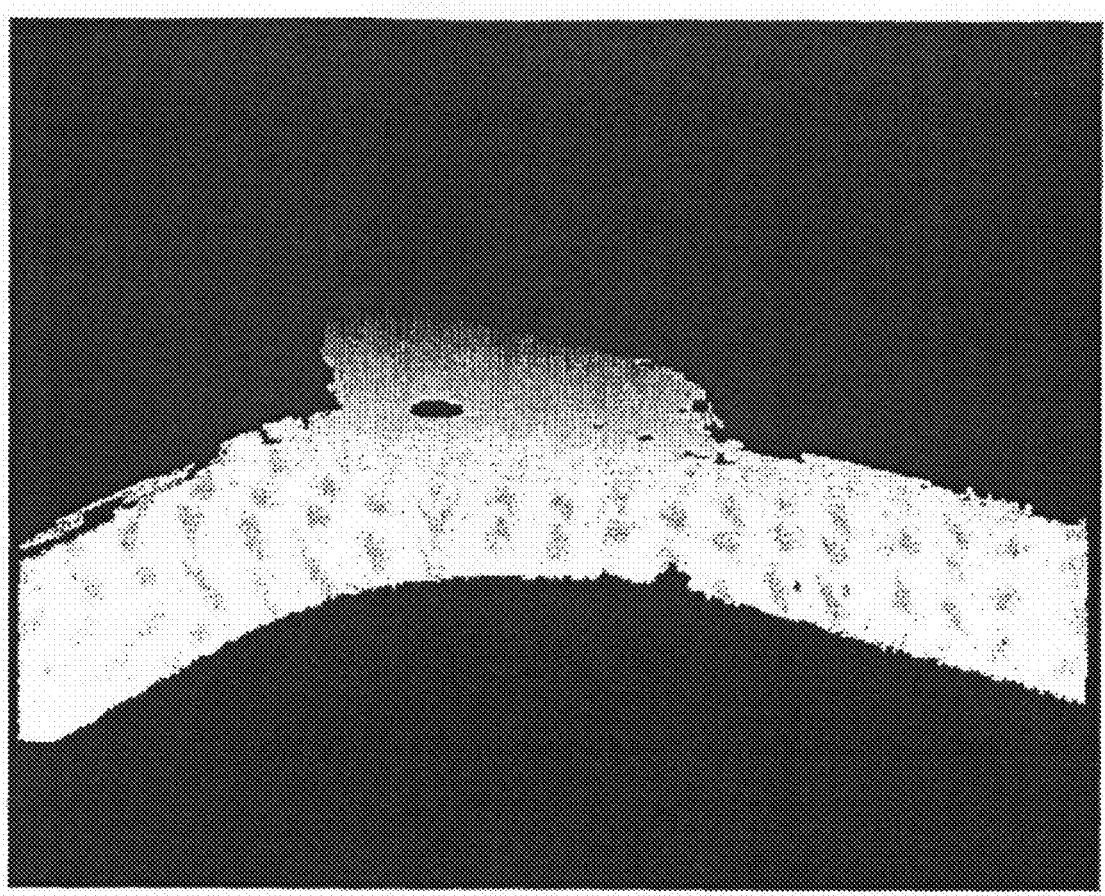
FIG. 6 is a sample 3D road map corresponding to the scene of FIG. 4.

FIG. 5 is a sample road map corresponding to the scene of FIG. 4 as produced by the road map detection unit after processing a sample ten minute long video stream. FIG. 6 is an example 3D road map corresponding to the scene of FIG. 4 as produced by the road map detection unit. The road map includes object scale information, wherein depth information ranges from dark=far, to bright=close.

Figure 7:
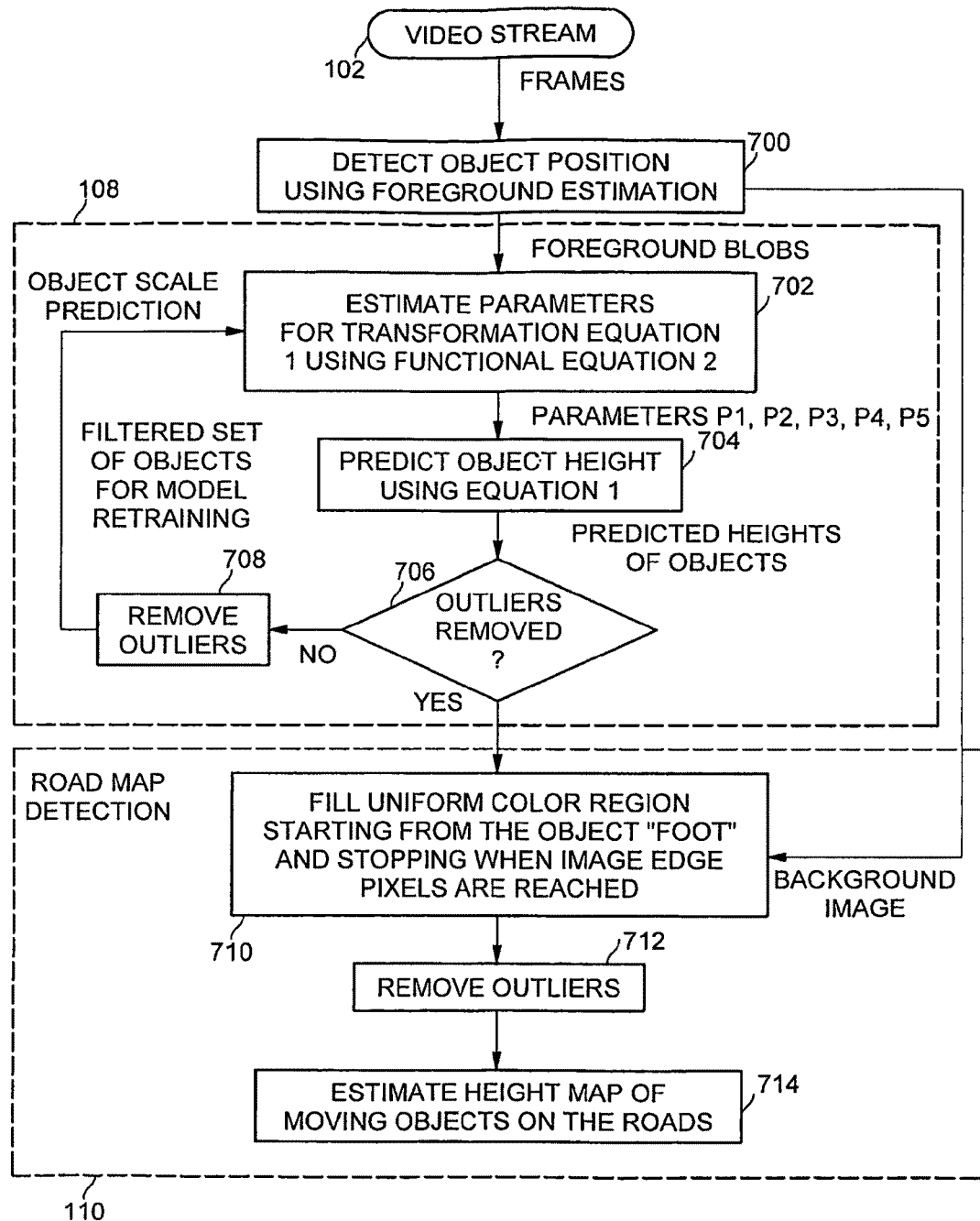
FIG. 7 is a flow diagram illustrating object scale prediction and road map detection processing according to an embodiment of the present invention.

FIG. 7 is a flow diagram illustrating object scale prediction and road map detection processing according to an embodiment of the present invention. Each frame of the video stream may be input to the object scale prediction unit 108, as well as to the road map detection unit 110. At block 700, the foreground object detection unit 104 detects the position of objects in the frame using foreground estimation. In some instances, the objects comprise a representation of a human being in the frame (e.g., a pedestrian). At block 702, the object scale prediction unit estimates the 3D transform parameters p1, p2, p3, p4, and p5 for transformation equation (1) using functional equation (2). At block 704, the object scale prediction unit predicts the height of objects using equation (1). Next, at block 706 the object scale prediction unit determines if outliers have been removed from the predicted heights of objects. If outliers have not yet been removed, then the outliers may be removed at block 708. This results in a filtered set of objects for model retraining. Processing then continues at block 702. If outliers have been removed, then processing continues with road map detection processing at block 710.

At block 710, the road map detection unit uses the background image obtained from the foreground object detection unit 104 and a region growing process to fill a uniform color region starting from each object's foot point and stopping when image edge pixels are reached. This action may be taken for each object in the data set of objects to generate a road map. At block 712, the outliers may be removed from the estimated road map. Finally, at block 714, a height map (i.e., scale map 114) for moving objects on the roads may be estimated based on the road map produced by road map detection unit 110.

Embodiments of the present invention propose a method for estimation of the scale of a typical object in a 3D scene and a method for road detection in the scene observed by a video camera. The present invention enables fully automatic video surveillance system calibration because of its ability for retraining on each video frame, outlier removal processing, and its characteristics of being self-adapting. The present invention is robust to scene luminance variation (e.g. during the day), video camera noise, and road coverage variation (e.g. after rain or snow). The present invention is unsupervised and able to self-calibrate in case of camera motion, partial scene variation, and other observed envelopment changes. The present invention also automatically estimates the transform between 2D coordinates in the camera image plane and 3D world coordinates of the roads of the observed scene.

Embodiments of the present invention may dramatically improve the reliability of many computer vision applications that require calibration of the relative positions between a camera and a 3D scene (such as human activity analysis, robotic vision, content creation, object detection and tracking, 3D scene understanding, video processing, 3D reconstruction, and gesture recognition systems). Embodiments of the present invention can make video surveillance systems more automated and more reliable. For example, the present invention can be configured to generate an alarm if a human is detected to be walking outside of a road or path boundary, or if the size of a detected object deviates from a predicted average.

Although the operations described herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of analyzing video frames capturing a 3D scene over time to automatically generate a road map of the 3D scene comprising:
    detecting positions of objects in the video frames;
    estimating 3D transformation parameters for the objects;
    predicting heights of the objects based at least in part on the 3D transformation parameters;
    removing outliers from the predicted heights of objects to produce a filtered set of objects;
    using the filtered set of objects to repeat estimating the 3D transformation parameters and to repeat predicting the heights of the objects;
    estimating road boundaries of the 3D scene using a background image and the positions of the objects by filling a uniform color region starting from a foot of a position of an object of the objects and stopping when an edge pixel of the background image is reached;
    generating the road map;
    removing outlier pixels from the road map; and
    estimating a height map for objects moving on a road of the road map.

2. The method of claim 1, wherein detecting positions of objects comprises applying a foreground object detection process to the video frames.

3. The method of claim 1, wherein estimating road boundaries comprises applying a region growing process to object positions to find pixels of the video frames belonging to a road surface in the 3D scene.

4. An article comprising: a tangible computer-readable storage medium containing instructions, which when executed, result in analyzing video frames capturing a 3D scene over time to automatically generate a road map of the 3D scene by
    detecting positions of objects in the video frames;
    estimating 3D transformation parameters for the objects;
    predicting heights of the objects based at least in part on the 3D transformation parameters;
    removing outliers from the predicted heights of objects to produce a filtered set of objects;
    using the filtered set of objects to repeat estimating the 3D transformation parameters and to repeat predicting the heights of the objects;
    estimating road boundaries of the 3D scene using a background image and the positions of the objects by filling a uniform color region starting from a foot of a position of an object of the objects and stopping when an edge pixel of the background image is reached;
    generating the road map;
    removing outlier pixels from the road map; and
    estimating a height map for objects moving on a road of the road map.

5. The article of claim 4, wherein instructions for detecting positions of objects comprises instructions for applying a foreground object detection process to the video frames.

6. The article of claim 4, wherein instructions for estimating road boundaries comprises instructions for applying a region growing process to object positions to find pixels of the video frames belonging to a road surface in the 3D scene.

7. A system comprising:
    a foreground object detection unit to analyze video frames of a 3D scene and detect objects and object positions in the video frames;
    an object scale prediction unit to estimate 3D transformation parameters for the objects, to predict heights of the objects based at least in part on the 3D transformation parameters, to remove outliers from the predicted heights of objects to produce a filtered set of objects, and to use the filtered set of objects to repeat estimating the 3D transformation parameters and to repeat predicting the heights of the objects; and
    a road map detection unit to generate the road map by estimating road boundaries of the 3D scene using the object positions and a background image by filling a uniform color region starting from a foot of a position of an object of the objects and stopping when an edge pixel of the background image is reached, removing outlier pixels from the road map, and estimating a height map for objects moving on a road of the road map.

8. The system of claim 7, wherein the road map detection unit estimates road boundaries by applying a region growing process to object positions to find pixels of the video frames belonging to a road surface in the 3D scene.

9. The method of claim 1, wherein the objects comprise a representation of a human being in the video frames.

10. The article of claim 4, wherein the objects comprise a representation of a human being in the video frames.

11. The system of claim 7, wherein the objects comprise a representation of a human being in the video frames.

* * * * *